United States Patent
Brown et al.

(10) Patent No.: US 8,011,080 B2
(45) Date of Patent: Sep. 6, 2011

(54) HINGED WALL AND CEILING ANCHOR WITH FINS AND HINGE

(75) Inventors: Gregory A. M. Brown, Danville, CA (US); Brian A. Brown, Alamo, CA (US)

(73) Assignee: International Patent Development Group, LLC, Alamo, CA (US)

( * ) Notice: Subject to any disclaimer, the term of this patent is extended or adjusted under 35 U.S.C. 154(b) by 406 days.

(21) Appl. No.: 12/210,205

(22) Filed: Sep. 14, 2008

(65) Prior Publication Data

US 2010/0067975 A1 Mar. 18, 2010

(51) Int. Cl.
F16B 13/10 (2006.01)

(52) U.S. Cl. ............ 29/525.13; 29/525.01; 29/525.07; 411/30; 411/344

(58) Field of Classification Search ........... 411/29, 411/30, 340, 344, 452; 29/525.13, 525.01, 29/525.02, 525.05, 525.07, 525.11, 525.12
See application file for complete search history.

(56) References Cited

U.S. PATENT DOCUMENTS

| | | | |
|---|---|---|---|
| 378,956 A * | 3/1888 | Frenot .................... | 24/99 |
| 1,452,514 A | 4/1923 | Karitzky | |
| 2,916,235 A | 12/1959 | Nagel | |
| 3,188,905 A * | 6/1965 | Millet .................... | 411/80.1 |
| 3,213,745 A | 10/1965 | Dwyer | |
| 3,431,813 A | 3/1969 | Johnson | |
| 3,550,499 A | 12/1970 | Ellenberger | |
| 3,983,779 A | 10/1976 | Dimas | |
| 4,022,100 A | 5/1977 | Johnson | |
| 4,181,061 A | 1/1980 | McSherry | |
| 4,289,062 A | 9/1981 | Schiefer | |
| 4,322,194 A | 3/1982 | Einhorn | |
| 4,500,238 A | 2/1985 | Vassiliou | |
| 4,662,808 A | 5/1987 | Camilleri | |
| 4,902,179 A | 2/1990 | Harker | |
| 5,037,257 A | 8/1991 | Kubic et al. | |
| 5,221,167 A | 6/1993 | Girkin | |
| 5,224,805 A | 7/1993 | Moretti | |
| 5,417,531 A * | 5/1995 | Brown .................... | 411/344 |
| 5,447,005 A | 9/1995 | Giannuzzi | |
| 5,533,851 A * | 7/1996 | Remmers ................. | 411/344 |
| 6,004,088 A * | 12/1999 | Hunt ....................... | 411/344 |
| 6,435,789 B2 | 8/2002 | Gaudron | |
| 6,494,653 B2 | 12/2002 | Remmers | |
| 6,634,840 B1 * | 10/2003 | Salmon et al. ........... | 411/44 |
| 6,641,107 B1 | 11/2003 | Janssen | |
| 7,752,732 B2 * | 7/2010 | Brown et al. ............. | 29/525.05 |
| 7,850,408 B2 * | 12/2010 | Ernst et al. .............. | 411/344 |
| 2006/0222474 A1 * | 10/2006 | Brown et al. ............. | 411/340 |

* cited by examiner

*Primary Examiner* — Flemming Saether
(74) *Attorney, Agent, or Firm* — David Pressman

(57) ABSTRACT

An anchoring fastener comprises, in one embodiment, a shaft (100) with straight and tapered portions, a tip (105) at the front end, cam follower surfaces (110, 111) at the rear end, a body (120) with a bore, a head (125) with a hole collinear with the bore in the body, and a pair of fins (115). The shaft and the body are joined at a bendable region by the fins. The anchor is fully inserted into wallboard (600) until the head comes into contact with the outer surface of the wallboard (610). The length of the body is approximately equal to the thickness of the wall. The fins slice into the wallboard, thereby preventing rotation of the anchor during and after insertion. An activating member (900), such as a screw or a pin, is inserted into the hole and bore and urged against the cam follower surfaces, thereby forcing the shaft to rotate until it comes into contact with the inner surface (615) of the wallboard. An object-holding washer (905), restrained by the activating member, is secured to the anchor which in turn is secured to the wallboard.

14 Claims, 4 Drawing Sheets

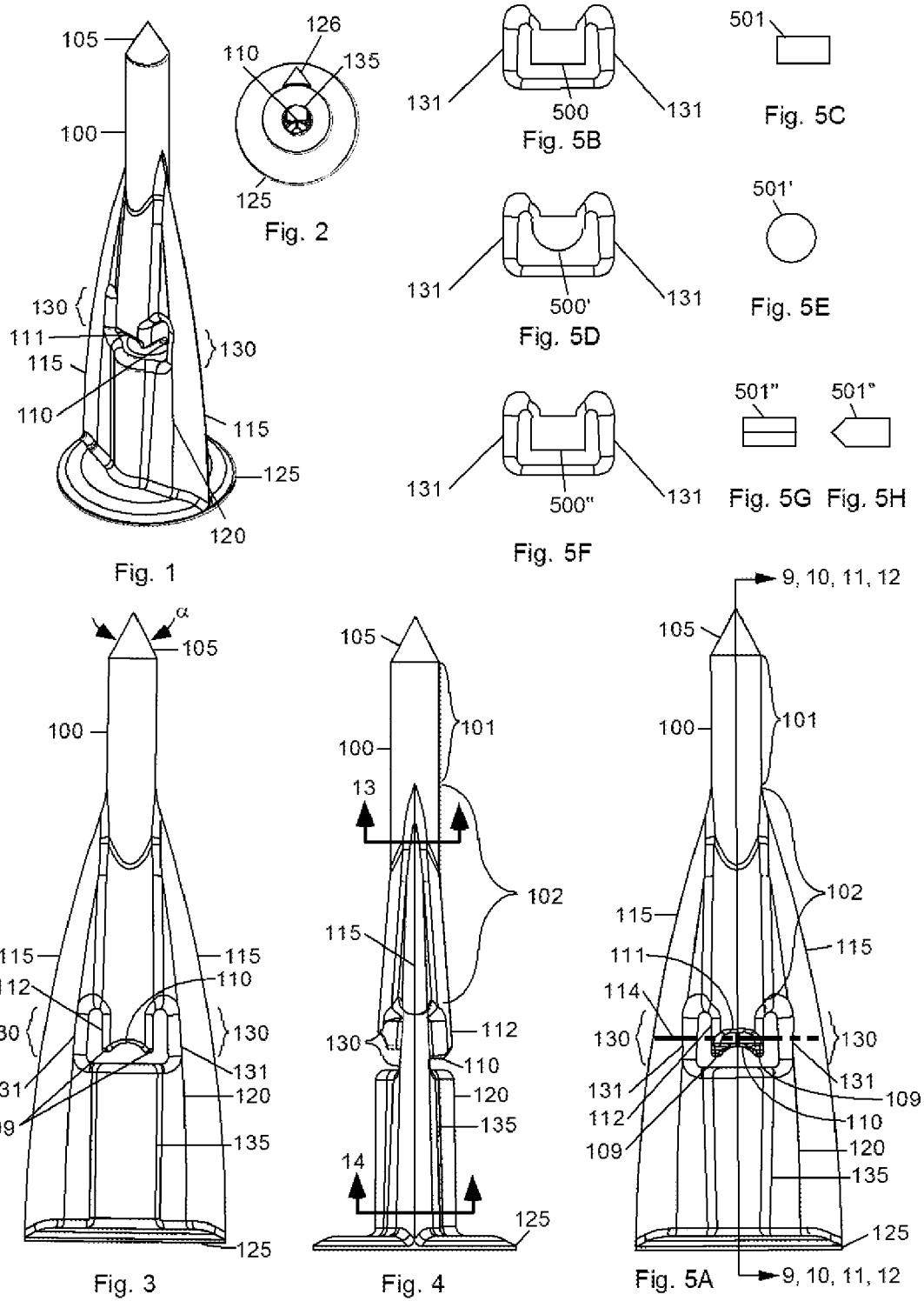

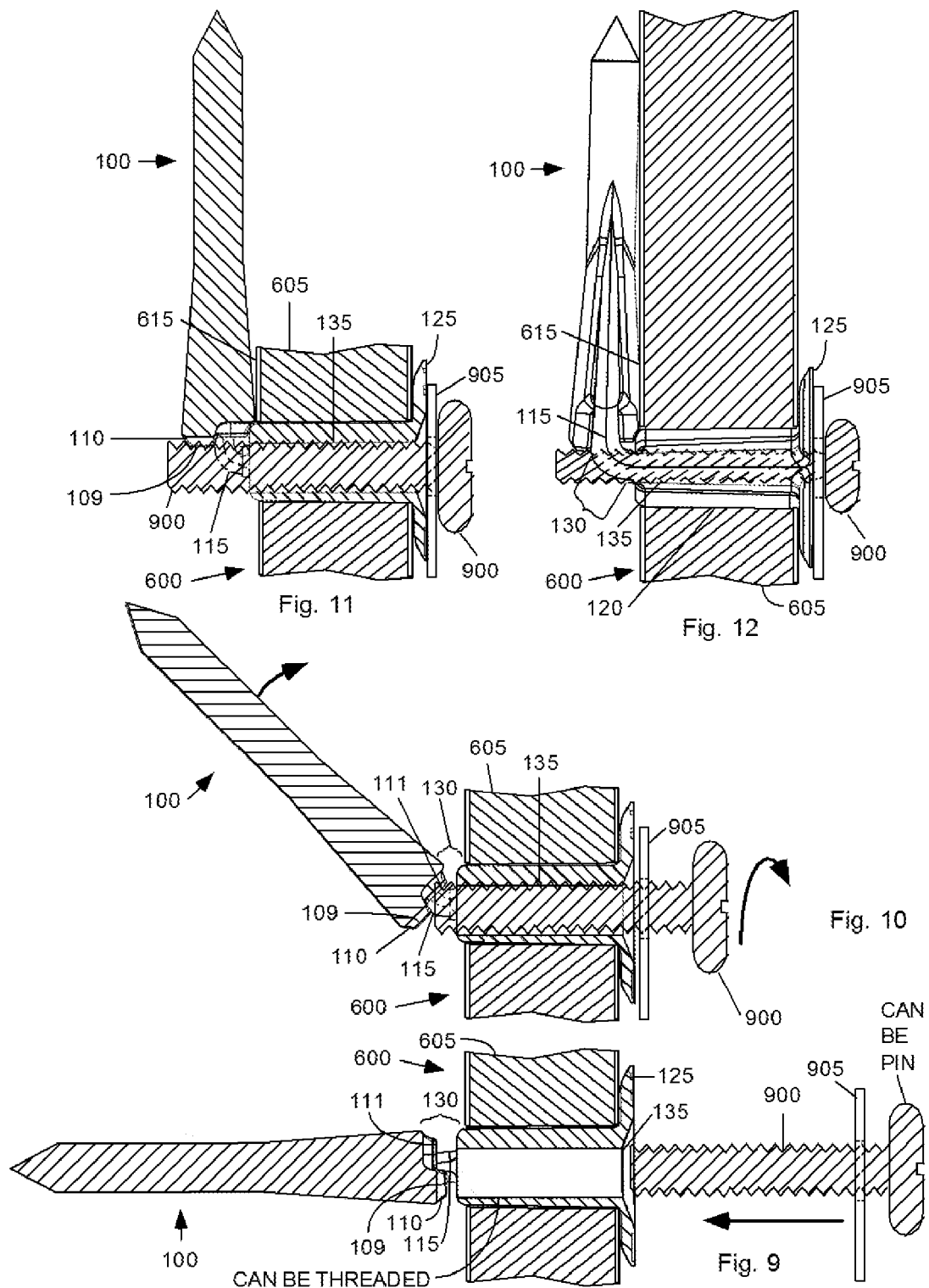

HINGED WALL AND CEILING ANCHOR WITH FINS AND HINGE

CROSS-REFERENCE TO RELATED APPLICATIONS

The following applications are related hereto: Ser. No. 11/747,093 of the present inventors and L. G. Brown, filed May 10, 2007, titled Anchoring Fastener With Movable Binding Member, and Ser. No. 11/850,896 of the present inventors, filed Sep. 6, 2007, titled Twist-To-Lock Anchoring Fastener.

BACKGROUND

1. Field

The field hereof is mounting systems, in particular to methods and apparatus for mounting fasteners to hollow walls and ceilings.

2. Prior Art

Most walls and ceilings of residential and commercial structures have a hollow cavity construction, i.e., there is a hollow space behind the wall. The wall comprises a sheet of material, typically between 1 and 2.54 cm thick, affixed to a suitable frame which includes wood or metal framing members (studs or joists). These are typically spaced on 41 or 61 cm centers. Such sheet material is sold, e.g., under the trademark SHEETROCK by United States Gypsum Co., Chicago, and is known generically as drywall, wallboard, plasterboard, and gypsum board. Another less common wall and ceiling material with similar characteristics is plaster applied over a lath substrate. In the discussion below, the term "wall" includes ceilings.

A variety of fasteners are commercially available for attaching, hanging, or securing objects such as pictures, mirrors, shelving, cabinetry, towel racks, handrails and other objects to a wall at a location other than over the area where a framing member is located. Such fasteners can be divided into two main and general types: toggle and expansion.

Toggle fasteners generally comprise two components. The first component has spreading or tilting arms and is inserted with the arms folded into a drilled hole in the wall material. The second component, typically a screw or pin, is inserted into a hole in the first component and such insertion activates the first component by causing the arms to tilt or spread within the hollow space behind the wall, thereby locking the fastener in place on the wall.

Expansion fasteners are generally secured by causing their diameter to increase. Some comprise a first component which is hammered into a wall or inserted into a pre-drilled hole. A second component such as a pin or screw is forced into a central, cylindrical cavity within the fastener, increasing its diameter.

In addition to these two main types, a third type has tangs which springably expand to resist pull-out of the fastener.

The toggle and expansion fasteners suffer from significant disadvantages. These include the need for drilling the wall for the fastener, difficulty in tightening properly since over-torquing the fastener or the screw often results in much damage and hence failure of the wall, and/or an unsightly over-sized hole when the fastener is removed from such an over-torqued condition. Some of these fastening systems are also non-removable or are difficult to remove without leaving a large, unsightly hole in the wall. In addition, expansion fasteners crush the friable drywall material, limiting the grip of the device in the wall. Fasteners which are hammered into the wall frequently cause "blow-out", or local fracturing, of the wall material, again limiting the grip of the device in the wall and leaving an unsightly or relatively large hole at the fastener site.

The above copending '093 and '896 applications use a hinged anchor with an insertable activating member. These are superior in many respects to the above anchors but are not optimal because, while they significantly reduce blow-out of the wall, they still may tend to cause some damage and are not as robust as possible.

SUMMARY

In accordance with one preferred embodiment, a fastener comprises a wall anchor section and a pivotable section or tip. The two sections are joined by an integral or "living" hinge or bending member. After the wall anchor section is seated, the pivotable section is forced to pivot at a bisecting line by a screw or pin, thereby causing the pivotable section to rest against the inside surface of the wall and securing the fastener.

DRAWING FIGURES

FIG. 1 is a perspective view of one aspect of one embodiment of a wall anchor.

FIGS. 2 through 5A are respectively front, bottom, side, and top views of the anchor of FIG. 1. FIGS. 5B to 5H are views of cam follower surfaces alternative to that shown in FIG. 3, and alternative camming members.

FIGS. 9 through 12 show activation of the embodiment of FIG. 1.

Figure 6:
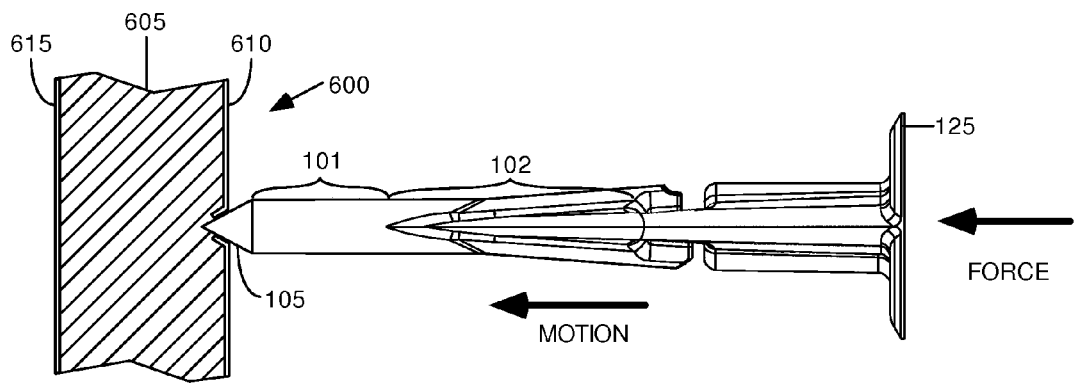
FIGS. 6 through 8 show insertion of the anchor of FIG. 1 into a wall.

| | | | |
|---|---|---|---|
| 100 | Shaft | 101 | First Portion |
| 102 | Second Portion | 105 | Tip |
| 109 | Flat Portions of 110 | 110 | Cupped Cam Follower |
| 111 | Cupped Cam Follower | 112 | Arm |
| 114 | Line | 115 | Fin |
| 120 | Body | 125 | Head |
| 126 | Indicium | 130 | Bendable Region |
| 131 | Column | 135 | Bore |
| 500 | Cam Follower | 501 | Alternative cams |
| 600 | Wallboard | 605 | Layer |
| 610 | Outer Layer | 615 | Inner Layer |
| 900 | Screw | 905 | Washer Or Other Flat Annulus |

PREFERRED EMBODIMENT

Description

FIGS. 1 Through 5

This anchor embodiment is intended to be driven or pushed into a wall or ceiling by a hammer or other instrument. No previously drilled hole is required. The anchor comprises a shaft 100 (FIG. 1) with a first and front or distal portion 101 (FIG. 4) and a second, adjacent portion 102 to the rear of portion 101. The rear or proximal portion includes a body 120, and a head 125 with an indicium or fiducial 126 (FIG. 2)

on its rear, or outer, surface. An imaginary line 114 (FIG. 5A) on shaft 100 bisects the anchor and is provided to indicate where portion 102 of the anchor pivots in use, as will be explained infra.

Shaft 100 has a pointed tip 105 (FIG. 1) at the front or leading end and lever arm 112 (FIGS. 4, 5A) at the rear end. Arm 112 generally has a cylindrical shape and extends from the rear end of shaft 100 to pivot line 114. Arm 112 includes two cam follower surfaces. A first cupped or concave cam follower surface 110 (FIG. 3) is located at the rear end of arm 112. Surface 110 terminates in two flat portions 109. A second cupped or concave cam follower surface 111 (FIGS. 5A, 9 and 10) is located midway between the rear end of arm 112 (surface 110) and pivot line 114. The cupped shapes of surfaces 110 and 111 open rearward toward body 120. FIGS. 5B to 5H show bottom views of cam follower surfaces alternative to the concave cam follower of FIG. 3. FIG. 5B shows a flat cam follower surface 500 adjacent a rectangular cam 501 (FIG. 5C). FIG. 5D shows a convex cam follower surface 500' adjacent a round cam 501' (FIG. 5E). FIG. 5F shows a flat cam follower surface 500" adjacent a ridged or crested cam 501" (FIGS. 5G and 5H).

A pair of sharpened fins 115 flare outward from shaft 100 beginning at the rear of portion 101 and extending continuously to head 125. Fins 115 are contiguous with shaft 100 in region 102. They are contiguous with body 120 over its entire length. Bendable connecting regions 130 in each of fins 115 separate shaft 100 from body 120. Shaft 100 and body 120 are joined by fins 115 and bendable strengthening columns 131, also extending over regions 130. Regions 130 are contiguous with fins 115 as they bridge region 130, forming a bendable portion of the anchor. Body 120 and head 125 include a bore 135.

Portion 101 of shaft 100 has a constant diameter over its length. The length of this portion is approximately equal to or greater than the thickness of the wallboard material into which the anchor is to be inserted. This reduces blow-out of the wall material because there is no larger body following tip 105 until the wall material has been fully penetrated. The diameter of portion 102 of shaft 100 tapers linearly from that of the portion 101 to that of body 120.

Fins 115 have a knife-like outer edge which can be smooth or serrated to cut through wallboard material. Over their length, the fins are contiguous with shaft 100 and with body 120. At their base, fins 115 gradually increase in thickness from zero at the front end of region 102 to about 3.5 mm at head 125. Over the same distance, fins 115 increase in height from zero to approximately 5 mm. Their gradual increase in width and thickness permit fins 115 to slice through wallboard materials without tearing or blowout. The gradual cutting action of the fins allows the body mass to be slowly introduced to ensure minimum disturbance to the drywall. At their widest point at the rear of the anchor, fins 115 are joined to head 125.

The angle, α, of tip 105 (FIG. 3) is preferably between 35 and 80 degrees, although other angles can be used if required. Angles within this range penetrate the surface paper of wallboard best, and are least apt to cause blow-out of the wall material. Although tip 105 has a conical shape, other shapes can be used.

The anchor is preferably at least 48 mm long, although other lengths can be used. The diameters of shaft 100 and head 125 are typically 3.50 mm and 15.00 mm, although other sizes can be used. The diameter of bore 135 is 3.50 mm, although other diameters can be used. The length of body 120 is selected to be approximately equal to the thickness of the wallboard into which the anchor will be installed, as described below. The anchor is made of a durable plastic material such as polyamide or polycarbonate, although other materials such as metal can be used.

PREFERRED EMBODIMENT

Operation

FIGS. 6 Through 12—Installation

Figure 7:
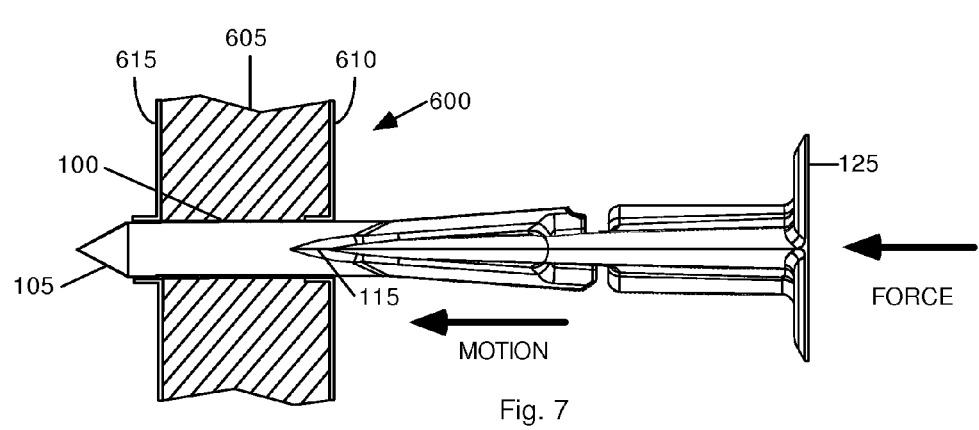
Figure 8:
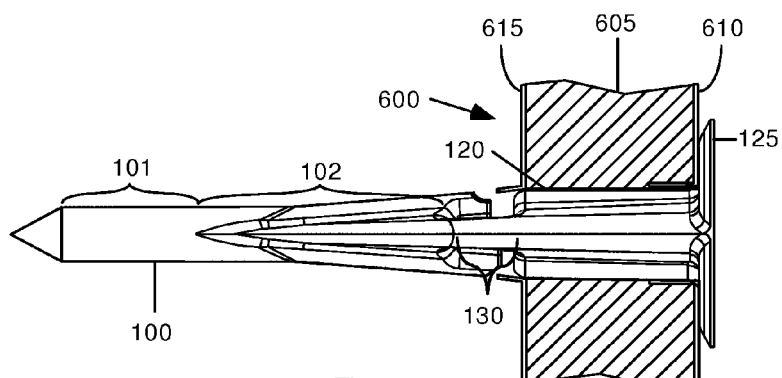

FIGS. 6 through 8 show the progress of an installation of an anchor into a wallboard 600, prior to activation. Wallboard 600 normally comprises a gypsum layer 605 that is sandwiched between front and rear paper layers 610 and 615, respectively. Prior to installation in wallboard 600, the anchor is oriented so that indicium 126 (FIG. 2) points upward. This will ensure that shaft 100 is oriented vertically with tip 105 pointing upward after installation is complete. FIG. 6 shows tip 105 penetrating front paper layer 610 and gypsum layer 605 under the urging of an externally applied force, such as hammer blows.

In FIG. 7, the externally applied force has urged the anchor through wallboard 600 so that tip 105 has passed through wallboard 600, causing little or no blowout. As described above, portion 101 of shaft 100 is sufficiently long that tip 105 has exited layer 615 of wallboard 600 before portion 102 enters and begins to displace the material in wallboard 600. Thin, nail-like portion 101 follows nail-like tip 105, thereby creating a pilot hole through which larger portion 102 and body 120 of the anchor can travel without causing substantial damage to wallboard 600. Fins 115 have begun slicing into wallboard 600 with a very slight angle of attack that gradually increases as the anchor is inserted in to wallboard 600, thereby gently introducing the slightly larger streamlined body volume of portion 102 into the pilot hole created by tip 105 and shaft 100. Fins 115 prevent rotation of the anchor from this point onward. Fins 115 create a larger surface or flat bearing area inside the wall to provide greater load bearing capacity and prevent the anchor from rotating after installation.

During insertion into wallboard 600, bendable regions 130 in fins 115 and strengthening columns 131 experience only axial forces and therefore remain straight, i.e., not-bent, in their initial configuration.

In FIG. 8, the anchor is fully inserted into wallboard 600 so that the front side of head 125 is pressed against the wallboard, preventing further insertion. The previously applied force is discontinued. Body 120 is just long enough to extend through wallboard 600. The front parts of the anchor (tip 105, first and second portions 101 and 102, and region 130) extend forwardly from the back or unseen side of the wallboard.

FIGS. 6 Through 12

Activation

FIGS. 9 through 12 show the progress or steps of activation of the anchor after its installation into wallboard 600. FIGS. 9 through 11 are cross-sectional side views of the anchor and FIG. 12 is an external view.

In FIG. 9, the anchor is installed in wallboard 600 as shown in FIG. 8 and is ready for activation. A screw 900 is positioned at the entrance of bore 135. Screw 900 has a thread diameter sufficient to rotatably interfere with bore 135, i.e., screw 900 is self-threading in bore 135. Alternatively, bore 135 can be supplied with threads that match screw 900. Screw 900 preferably has a pan or flat-tipped head as shown, although convex or concave tips can be used. Instead of a screw, another kind of activating member can be used, such as a pin that is slidably urged into bore 135. An object-holding washer 905 or other flat annulus to be secured to wallboard 600 is slid over screw 900 prior to inserting screw 900 into bore 135. Washer 905 can have a hook on its bottom side (not shown) for holding a picture-hanging wire, or can be any other object having a flat annulus, wire, or other portion which can be hung on the screw 900.

In FIG. 10, screw 900 has been rotatably advanced into the anchor and its flat end has contacted cam follower surface 110, forcibly urging surface 110 away from body 120. As surface 110 moves away from body 120, fins 115 and columns 131 are forced to curvably bend at regions 130, thereby forming a pair of straps that extend across line 114 (FIG. 5) about which shaft 100 pivots.

If the thickness of wallboard 600 is equal to the length of body 120, region 130 will execute a gradual bend adjacent portion 102 of the anchor, as shown in FIG. 12. This bend is approximately 90 degrees.

If the thickness of wallboard 600 is greater than the length of body 120, and less than the combined length of body 120 and region 130, region 130 will execute a more gradual bend, nearer the tip end of the anchor, than shown in FIG. 12. I.e., line 114 will move toward tip 105 within region 130. This bend ranges from approximately 90 degrees to slightly more than 90 degrees—around 100 degrees.

If the thickness of wallboard 600 is less than the length of body 120, region 130 will execute a sharper bend than shown in FIG. 12. This bend ranges from approximately 90 degrees or slightly less than 90 degrees (around 80 degrees), thus allowing the shaft 100 and tip to reach back and press against the wall, securing the anchor.

Thus the anchor can accommodate wallboard thicknesses that range from less than the length of body 120 to those nearly equal to the combined length of body 120 and region 130. This permits one anchor to be used for multiple thicknesses of wallboard. In all cases it is desirable that shaft 100 rotate through an angle sufficient for at least one point on shaft 100 to bear against inner surface 615 of wallboard 600 after activation.

In FIG. 11, screw 900 is fully advanced into the anchor. As it moves into the anchor, screw 900 first encounters cam follower surface 110, urging this surface away from body 120 and beginning to rotate shaft 100 upward. As screw 900 advances, surface 110 moves away, allowing the tip of screw to move down into the cup shape of cam follower surface 111. The cup shape of surface 111 aids in capturing, centering and guiding screw 900 as it moves along the axis of the anchor, and also causes shaft 100 to further rotate upward.

As screw 900 continues to move into the anchor, screw 900 moves past surface 111 and comes into contact with the top portion of surface 110, which presents screw 900 with a longer lever arm than offered by camming surface 111 and thereby provides a greater moment of force which can be applied, urging shaft 100 to continue to rotate until it assumes an approximately vertical or past-vertical position where it is lodged against inner surface layer 615 of wallboard 600. Screw 900 is now resting in the grooved surface of surface 110. This groove provides a guide to ensure that the screw 900 does not leave its centered position. At this point, washer 905 is securely attached to and cannot be pulled out from wallboard 600 and installation and activation of the anchor are complete.

FIG. 12 is an external view of the anchor, showing the bending of region 130 (comprising fins 115 and columns 131) to an angle of at least 90 degrees, so that shaft 100 rests firmly against inside surface 615 of wallboard 600. The loads applied to the anchor by washer 905 are horizontal (pull out) and vertical (shear). The resultant vector of these forces applies a clockwise torque to body 120 which is resisted by an equal counterclockwise torque exerted against vertically-oriented shaft 100 by surface 615 of wallboard 600. Thus the anchor is securely fixed in wallboard 600. Horizontally oriented fins 115 create a large surface area within wallboard 600 to resist shear, rotational, and vertical forces as well.

Since indicium 126 (FIG. 2) was oriented at the top before the anchor was driven into the wallboard, cam followers 110 and 111 are oriented on the upper side of the axis of camming screw 900 so that screw 900 will force the forward portion of the anchor to bend upwardly as the screw is inserted. The upwardly bent, forward portion will press against the inside of wallboard 605 (FIG. 12) when downward force is applied to screw 900 by washer 905 or any object hung thereon.

The anchor can optionally be inserted with indicium 126 facing downward so that when the anchor is activated shaft 100 rotates downward, instead of upward. This orientation is preferable when anchoring large shear loads.

FIGS. 13 Through 17

Features that Reduce or Eliminate Blow-Out During Installation

Using standard paper-sided, gypsum wallboard material, it has been experimentally determined that blowout of wallboard 600 does not occur when the diameter of shaft 100, with tip 105 as described above, is less than or equal to approximately 4.2 mm. The diameters of shaft 100, body 120 and head 125 are preferably 3.5, 6, and 15 mm, respectively, although other diameters can be used. In any case, the diameters of body 120 and head 125 are generally greater than that of shaft 100. Therefore, body portion 102 and fins 115 must be shaped properly in order to minimize or prevent blow-out due to their size.

Forces perpendicular to the plane of wallboard 600: Blow-out results from tearing of paper layers 605 and 610, and disruption of the friable gypsum layer 605 of wallboard 600. This disruption is caused by compressive and other forces within layer 605, near rear surface layer 615 that are exerted when the anchor is forced through wallboard 600. Compressive forces within wallboard 600 result when an object, such as shaft 100, penetrates layer 610 of wallboard 600 and compresses gypsum material 605. In addition, tensile (stretching) forces occur within wallboard 600 when the anchor has been pushed about halfway through wallboard 600 on its way to layer 615. From about this point onward the anchor tends to push out the back portion of material 605 adjacent back paper layer 615, as well layer 615 itself. This action exerts a pulling or tensile force on the front portion of material 605 and, to some extent, front paper layer 610. These forces are mainly perpendicular to wallboard 600. They are generally more destructive and disruptive than the compressive forces since the compressive forces are transmitted throughout the wallboard material, but the force against the back portion of material 605 and paper layer 615 meets less backup resistance and thus tend to cause greater disruption. In order to reduce blow-out, these disruptive forces must be kept to a minimum.

During installation of a wall anchor, compressive forces occur at the point of entry of the anchor at layer 610, while tensile forces occur at the back side, or exit point of the anchor at layer 615, of wallboard 600. These forces are perpendicular to the plane of wallboard 600. Compressive forces tend to strengthen wallboard 600, while tensile forces weaken it. This is seen when a blunt object with diameter greater than about 5 mm is driven into wallboard 600. Layer 610 at the entry point of the object is generally undamaged, while at the exit point layer 615 is torn and the material in layer 605 crumbles and falls away.

Forces parallel to the plane of wallboard 600: During installation of a wall anchor, displacement of wallboard layers 605, 610, and 615 parallel to the plane of wallboard 600 is compressive only. These compressive forces can actually strengthen wallboard 600 by compacting the gypsum material in inner layer 605.

Disruption of Wallboard by Anchor Portion 102

Figure 13:
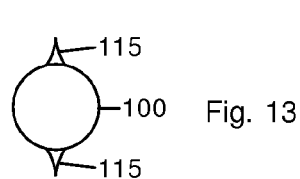
FIGS. 13 and 14 show axial views of front and rear portions, respectively, of the anchor of FIG. 1.

FIGS. 7 and 13 respectively show side and top views of the insertion of shaft 100 into wallboard 600. Since shaft 100 has a diameter less than the critical 4.2 mm, there is no blow-out of wallboard 600 due to the insertion of shaft 100.

FIG. 8 shows the anchor fully seated with head 125 in contact with layer 610 of wallboard 600. At the right end of the anchor, body 120 has the same diameter along its entire length. Thus, once portion 102 has passed through wallboard 600, body 120 slides into place with little or no force being applied to wallboard 600 by body 120 during insertion of the anchor. It is important to reduce the perpendicular tensile force within wallboard 600 during insertion, yet it is necessary to increase the diameter of the anchor from portion 101 of shaft 100 to that of body 120. The diameter of portion 102, not including fins 115, has increased from about 3.5 mm at portion 101 of shaft 100 to about 6 mm at body 120. Thus the change in diameter has a horizontal and a vertical component. A linear slope in portion 102 provides the least disruptive horizontal tensile force during insertion of the anchor.

If the vertical component occurs in a single step, blow-out of wallboard 600 is very likely to occur since all of the horizontal insertion force will be exerted at the leading edge of the step. This cause of blow-out is discussed further below in connection with FIG. 17.

Disruption of Wallboard by Fins 115

Figure 14:
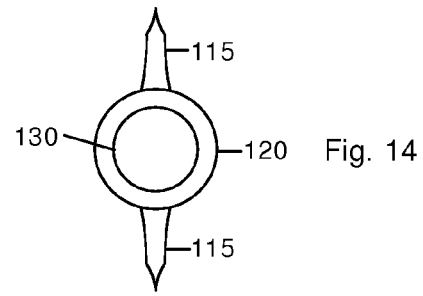

FIG. 13 shows fins 115 at the start of region 102, as indicated in FIG. 4. FIG. 14 shows fins 115 near head 125, also as indicated in FIG. 4. The cross-section of fins 115 is similar to that of a knife blade. Fins 115 are designed to slice into wallboard 600 and compress layer 605 progressively in the plane of wallboard 600 as the anchor is inserted.

Figure 15:
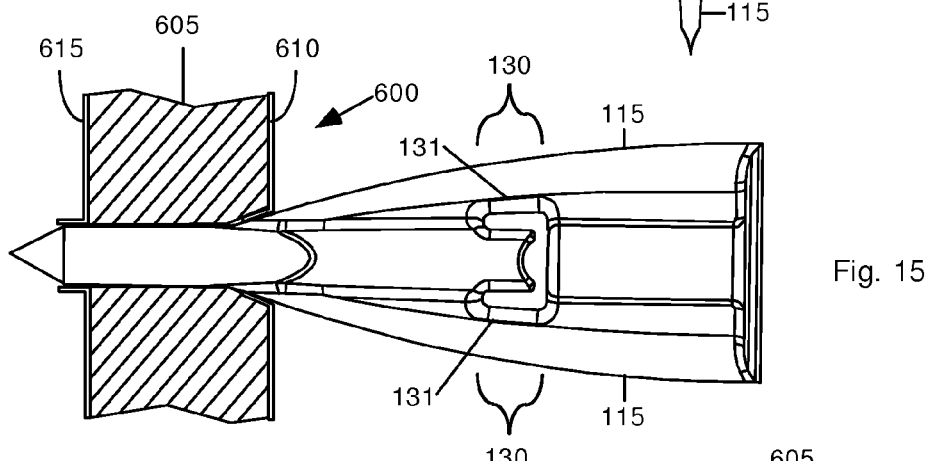
FIGS. 15 and 16 show partially sectional side views of the anchor entering and fully seated in a wallboard, respectively.
Figure 16:
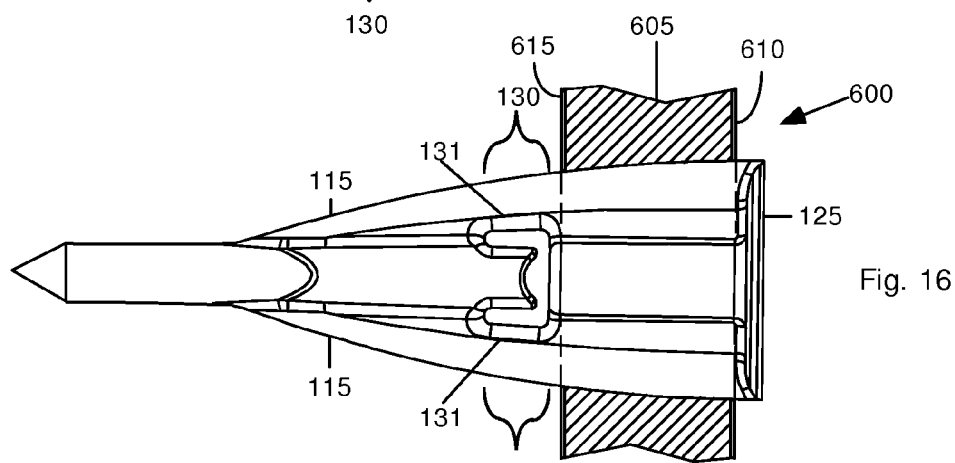

FIGS. 15 and 16 respectively show the anchor as the fins are entering wallboard 600, and as the anchor is fully seated in wallboard 600.

In order to maintain the strength of the anchor in bending region 130, fins 115 must be as wide as possible in this region. Yet to firmly secure the anchor in wallboard 600, the outer edges of fins 115 must be nearly parallel to the axis of the anchor at body 120. Thus, in FIG. 15, the starting edges of fins 115 are parallel to the axis of the anchor, and in FIG. 16 the ending edges of fins 115, next to head 125, are also nearly parallel to the axis of the anchor. Therefore fins 115 are arranged to slice into wallboard 600 to within 80 percent of their width in region 102, leaving another 20 percent of slicing to be done in the remaining length of body 120. This compromise results in the maximum strength of region 130 and the minimum horizontal force resisting entry of the anchor in the region of body 120.

As in the case of the diameter of shaft 100 in region 102, there are no abrupt changes in the width of fins 115, since any abrupt changes would only meet resistance in wallboard 600 and result in blowout as the anchor is installed.

Figure 17:
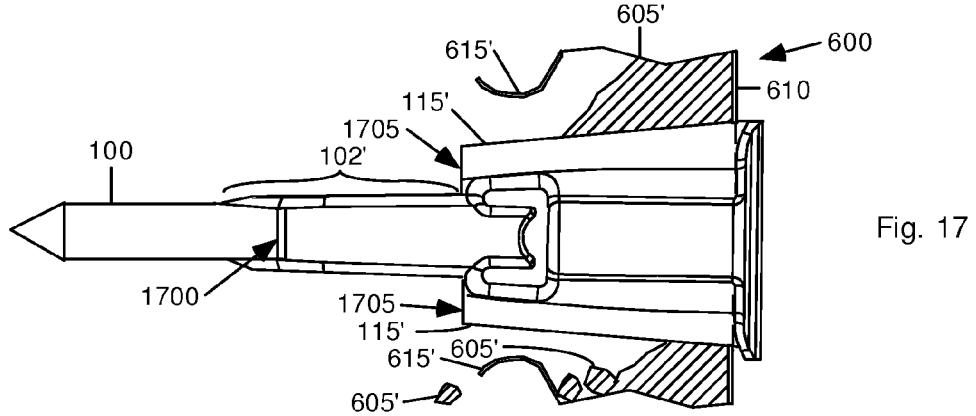
FIG. 17 shows a partially sectional side view of an anchor with abrupt changes in its fins or shaft fully seated in a wallboard.

FIG. 17 shows the effect of abrupt changes in the width of fins 115 or portion 102 of shaft 100. The anchor has been seated in wallboard 600 with no apparent damage to front layer 610. However, the abrupt change in width of region 102' of shaft 100, indicated at 1700, and the abrupt change in width of fins 115', indicated at 1705, have engaged the material comprising inner layer 605 of wallboard 600 and forced it backwards. The backward force against layers 605 and 615 is tensile since there is no restoring force applied against layer 615. Thus blow-out occurs and the anchor is only poorly secured. A failed installation has occurred since, while the anchor may appear normal to the user, wallboard 600 has been severely damaged and weakened. With wallboard 600 in this condition, the anchor could easily pull out of the wall.

CONCLUSIONS, RAMIFICATIONS AND SCOPE

The embodiment shown of our wall anchor provides several useful and advantageous features. For example, the bendable region and fins are formed of a single unit. The tip and the rear portion of the shaft are the same diameter, thereby reducing or eliminating blow-out of the wallboard. Installation is easily accomplished by tapping the anchor into a wall or ceiling with a hammer. Activation is accomplished by insertion of a standard, flat-tipped screw or pin. An improved anchor with superior holding force results. Pull-out is prevented by the angled shaft while a screw is present; however the anchor can be removed by simply removing the screw (which allows the shaft to straighten) and withdrawing the anchor.

While the above description contains many specificities, these should not be considered limiting but merely exemplary. Many variations and ramifications are possible. For example, additional fins can be incorporated on the body, a lubricant can be applied to the outside of the anchor during insertion to facilitate entry into very hard materials, anchors can be supplied in cartridges to enable automatic insertion by a gun. Instead of a flat-tipped screw, other screws having pointed or cupped tips can be used. Instead of a screw, a smooth, rough, loose or tight-fitting pin or even a nail can be used in place of a flat-tipped screw. The anchor can be supplied in a variety of colors and sizes. The colors and sizes can be coordinated by a color code that indicates the size of the anchor or the activating screw, or both.

While the present system employs elements which are individually known to those skilled in the art of fastener fabrication, it combines and shapes these elements in a novel way which produces new results not heretofore discovered. Accordingly the scope should be determined, not by the embodiments illustrated, but by the appended claims and their legal equivalents.

The invention claimed is:
1. A method for anchoring an object to a wall, comprising:
   providing an anchoring fastener having a head with front and rear surfaces, a cylindrical body joined to said head, a bore passing through said head and said body, a shaft with a cylindrical portion having a tip at the front end and a tapered portion having first and second camming surfaces at the rear end, said cylindrical and said tapered portions being approximately the same length, a plurality of sharpened fins extending radially outward from and joining said shaft and said body, said fins forming a bendable region between said shaft and said body,
   providing an activating member, selecting a location on a wall that has a hollow volume therebehind, said wall having outer and inner surfaces, passing said tip, said shaft, and said body through said wall until said front surface of said head is in contact with said outer surface of said wall, inserting said activating member into said bore and urging said activating member into contact with said second and then said first camming surfaces, forcing said bendable region to bend, thereby rotating said shaft until said shaft comes into contact with said inner surface of said wall, whereby said activating member can be secured within said fastener in an anchoring configuration.

2. The method of claim 1 wherein said second camming surface has shape selected from the group consisting of cupped and flat.

3. The method of claim 1 wherein said fastener is made from materials selected from the group consisting of plastics and metals.

4. The method of claim 1 wherein the angle of said tip has a value between 35 and 80 degrees.

5. The method of claim 1 wherein said activating member is selected from the group consisting of screws and pins.

6. The method of claim 5 wherein said activating member is a screw which has a sufficient diameter to be capable of self-threading within said bore.

7. The method of claim 1 wherein said bore is threaded.

8. A method for anchoring an object to a wall, comprising:

providing an anchoring fastener having separate distal section and proximal sections, said sections being initially collinear and joined at a bendable region by a plurality of fins, said fins extending radially outward from said distal and said proximal sections and tapered from front to rear, said proximal section further including a bore, said distal section further including a camming surface, inserting said fastener said distal section first into a wall with a hollow volume therebehind, providing an activating member, urging said activating member into said bore and pushing against said camming surface, thereby forcing said distal section to rotate about said bendable region until said distal section comes into contact with said wall in said hollow volume, thereby securing said fastener and said activating member in said wall.

9. The method of claim 8 wherein said second camming surface includes a cupped shape.

10. The method of claim 8 wherein said fastener is made from materials selected from the group consisting of plastics and metals.

11. The method of claim 8 wherein said distal section includes a tip, the angle of said tip having a value between 35 and 80 degrees.

12. The method of claim 8 wherein said activating member is selected from the group consisting of screws and pins.

13. The method of claim 12 wherein said activating member is a screw which has a sufficient diameter to be capable of self-threading within said bore.

14. The method of claim 8 wherein said bore is threaded.

\* \* \* \* \*